United States Patent
Ahn et al.

(10) Patent No.: US 10,090,559 B2
(45) Date of Patent: Oct. 2, 2018

(54) NON-AQUEOUS ELECTROLYTE AND LITHIUM SECONDARY BATTERY INCLUDING THE SAME

(71) Applicant: LG Chem, Ltd., Seoul (KR)

(72) Inventors: Kyoung Ho Ahn, Daejeon (KR); Chul Haeng Lee, Daejeon (KR); Yoo Seok Kim, Daejeon (KR); Doo Kyung Yang, Daejeon (KR); Young Min Lim, Daejeon (KR); Jung Hoon Lee, Daejeon (KR)

(73) Assignee: LG Chem, Ltd. (KR)

( * ) Notice: Subject to any disclaimer, the term of this patent is extended or adjusted under 35 U.S.C. 154(b) by 605 days.

(21) Appl. No.: 14/419,547

(22) PCT Filed: Sep. 1, 2014

(86) PCT No.: PCT/KR2014/008159
§ 371 (c)(1),
(2) Date: Feb. 4, 2015

(87) PCT Pub. No.: WO2015/037852
PCT Pub. Date: Mar. 19, 2015

(65) Prior Publication Data
US 2016/0028116 A1 Jan. 28, 2016

(30) Foreign Application Priority Data
Sep. 10, 2013 (KR) .................. 10-2013-0108578

(51) Int. Cl.
*H01M 10/0567* (2010.01)
*H01M 10/052* (2010.01)
*H01M 10/0568* (2010.01)
*H01M 10/0569* (2010.01)
*H01M 10/0525* (2010.01)

(52) U.S. Cl.
CPC ..... *H01M 10/0567* (2013.01); *H01M 10/052* (2013.01); *H01M 10/0525* (2013.01); *H01M 10/0568* (2013.01); *H01M 10/0569* (2013.01); *H01M 2300/0025* (2013.01); *H01M 2300/0037* (2013.01)

(58) Field of Classification Search
CPC ........... H01M 10/0567; H01M 10/052; H01M 10/0525; H01M 10/0569; H01M 10/0568
See application file for complete search history.

(56) References Cited

U.S. PATENT DOCUMENTS

| 9,012,094 | B2 | 4/2015 | Tikhonov et al. |
| 2002/0015895 | A1 | 2/2002 | Ueda et al. |
| 2006/0199080 | A1 | 9/2006 | Amine et al. |
| 2008/0193854 | A1 | 8/2008 | Yamaguchi et al. |
| 2009/0305145 | A1 | 12/2009 | Kim et al. |
| 2009/0325065 | A1* | 12/2009 | Fujii ............... H01M 4/04 429/199 |
| 2010/0040954 | A1* | 2/2010 | Amine ............. H01G 9/038 429/322 |
| 2010/0261068 | A1 | 10/2010 | Jeon et al. |
| 2011/0027663 | A1 | 2/2011 | Ohkubo et al. |
| 2011/0136019 | A1 | 6/2011 | Amiruddin et al. |
| 2012/0088161 | A1 | 4/2012 | Yoon et al. |
| 2013/0078532 | A1 | 3/2013 | Chen et al. |

FOREIGN PATENT DOCUMENTS

| EP | 0589229 A1 * | 3/1994 | ........ H01M 10/0568 |
| JP | 2003051336 A | 2/2003 | |
| JP | 2003272702 A | 9/2003 | |
| JP | 2005285492 A | 10/2005 | |
| JP | 2007035355 A | 2/2007 | |
| JP | 2007317655 A | 12/2007 | |
| JP | 2008532248 A | 8/2008 | |
| JP | 2008282619 A | 11/2008 | |
| JP | 2010176930 A | 8/2010 | |
| JP | 2010530118 A | 9/2010 | |
| JP | 2010282836 A | 12/2010 | |
| JP | 2013513205 A | 4/2013 | |
| KR | 20010095277 A | 11/2001 | |
| KR | 20070095785 A | 10/2007 | |
| KR | 20080086638 A | 9/2008 | |
| KR | 20090120962 A | 11/2009 | |
| KR | 20100097621 A | 9/2010 | |
| KR | 20100137415 A | 12/2010 | |
| KR | 20130035936 | * 10/2014 | .......... H01M 10/052 |

OTHER PUBLICATIONS

English translation of KR20130035936.*
Extended Search Report from European Applicaton No. 14830779.6, dated Aug. 11, 2016.
International Search Report for Application No. PCT/KR2014/008159 dated Dec. 17, 2014.

* cited by examiner

Primary Examiner — Carlos Barcena
(74) Attorney, Agent, or Firm — Lerner, David, Littenberg, Krumholz & Mentlik, LLP

(57) ABSTRACT

Provided are a non-aqueous electrolyte including a non-aqueous organic solvent, a lithium salt, and a borate-based compound, and a lithium secondary battery using the same. According to the present invention, a lithium secondary battery having improved cycle characteristics and high-temperature storage stability may be prepared by including a non-aqueous electrolyte which includes at least one borate-based compound as an additive.

13 Claims, 1 Drawing Sheet

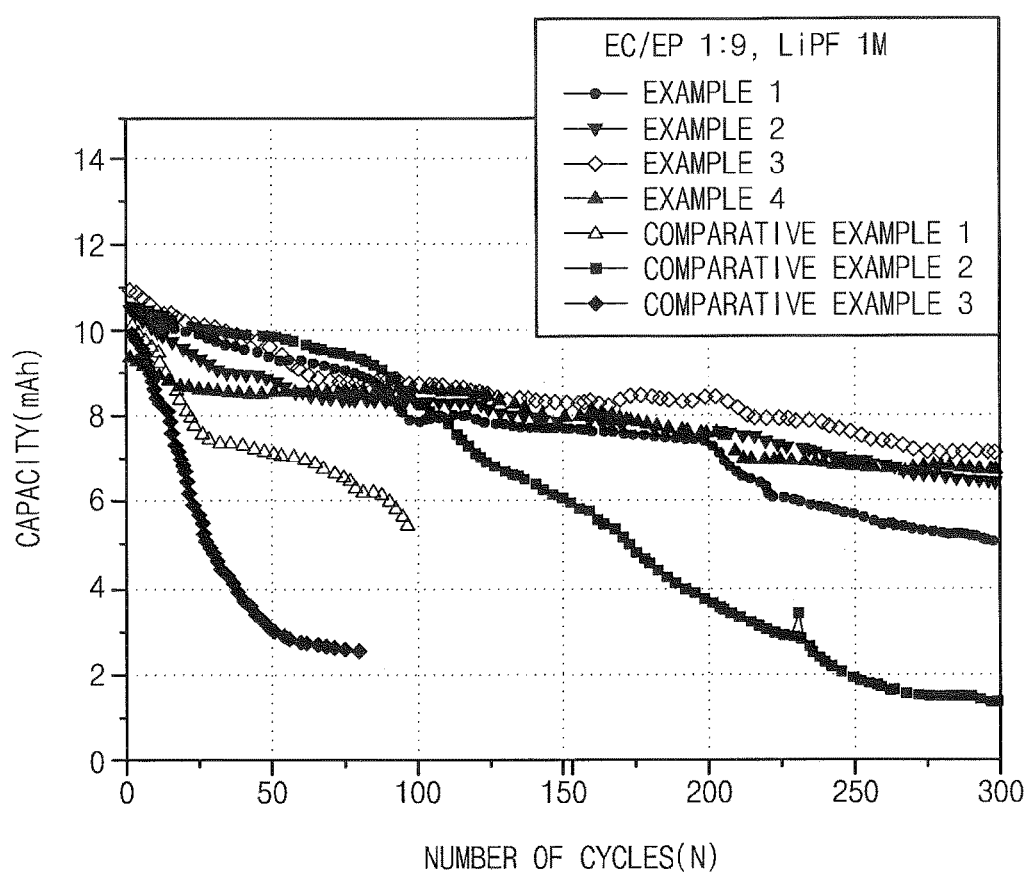

NON-AQUEOUS ELECTROLYTE AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2014/008159, filed Sep. 1, 2014, which claims priority to Korean Patent Application No. 10-2013-0108578, filed Sep. 10, 2013, the disclosures of which are incorporated herein by reference.

TECHNICAL FIELD

The present invention relates to a non-aqueous electrolyte and a lithium secondary battery including the same, and more particularly, to a non-aqueous electrolyte including at least one borate-based compound as an additive and a lithium secondary battery including the same.

BACKGROUND ART

In line with the realization of miniaturization and weight reduction in electronic devices and the generalization of the use of portable electronic devices, research into secondary batteries having high energy density, as power sources of such electronic devices, has been actively conducted.

The secondary batteries may include nickel-cadmium secondary batteries, nickel-metal hydride secondary batteries, nickel-hydrogen secondary batteries, and lithium secondary batteries, and in particular, among these batteries, research into lithium secondary batteries, which not only have a discharge voltage two or more times higher than a typical battery using an alkaline aqueous solution, but also have high energy density per unit weight and is capable of rapid charging, has emerged.

The lithium secondary battery is composed of a cathode formed of a lithium metal oxide, an anode formed of a carbon material or a lithium alloy, and an electrolyte formed of a lithium salt and an organic solvent.

In this case, since the organic solvent is easily volatized and has high flammability, short circuit and fire due to internal heat during overcharge and overdischarge may occur. Thus, high-temperature safety of the lithium secondary battery may be reduced.

Therefore, research into developing an electrolyte capable of improving cycle life and high-temperature lifespan of the battery has been variously attempted.

DISCLOSURE OF THE INVENTION

Technical Problem

The present invention provides a non-aqueous electrolyte including an additive which may improve room-temperature and high-temperature stability.

The present invention also provides a lithium secondary battery in which battery cycle characteristics and high-temperature storage stability are improved by including the non-aqueous electrolyte.

Technical Solution

According to an aspect of the present invention, there is provided a non-aqueous electrolyte including: a non-aqueous organic solvent; a lithium salt; and a borate-based compound represented by Chemical Formula 1:

[Chemical Formula 1]

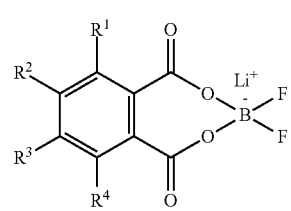

in Chemical Formula 1,
$R^1$ to $R^4$ are each independently a halogen or a halogen-substituted alkyl having 1 to 3 carbon atoms.

According to another aspect of the present invention, there is provided a non-aqueous electrolyte further including at least one borate-based compound selected from the group consisting of Chemical Formula 2 and Chemical Formula 3:

[Chemical Formula 2]

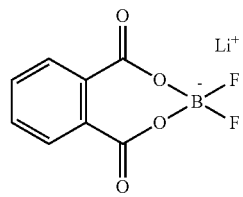

[Chemical Formula 3]

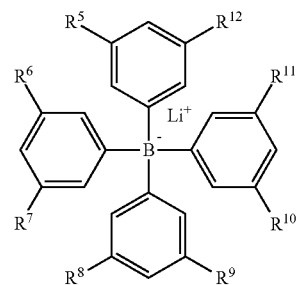

in Chemical Formula 3,
$R^5$ to $R^{12}$ are each independently hydrogen, an alkyl having 1 to 3 carbon atoms, a halogen, or a halogen-substituted alkyl having 1 to 3 carbon atoms.

According to another aspect of the present invention, there is provided a lithium secondary battery including: a cathode; an anode; a separator disposed between the cathode and the anode; and the electrolyte of the present invention.

Advantageous Effects

According to the present invention, a lithium secondary battery having improved cycle characteristics and high-temperature storage stability may be prepared by including a non-aqueous electrolyte which includes at least one borate-based compound as an additive.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

The FIGURE is a graph comparing the results of the measurement of high-temperature cycle characteristics of lithium secondary batteries prepared in Examples 1 to 4 and Comparative Examples 1 to 3.

MODE FOR CARRYING OUT THE INVENTION

Hereinafter, preferred embodiments of the present invention will be described in more detail. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention. Accordingly, since the embodiments set forth in the present specification and the configurations illustrated in the drawings are shown by way of example and do not represent all the technological spirit of the present invention, it should be understood that embodiments of the present invention are capable of various modifications, equivalents, and alternatives at the time of present application.

Specifically, the present invention provides a non-aqueous electrolyte including a non-aqueous organic solvent, a lithium salt, and a borate-based compound represented by Chemical Formula 1 below:

[Chemical Formula 1]

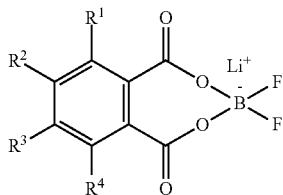

In Chemical Formula 1,
$R^1$ to $R^4$ are each independently a halogen or a halogen-substituted alkyl having 1 to 3 carbon atoms.

Specifically, $R^1$ to $R^4$ in Chemical Formula 1 may be a halogen, and, for example, the borate-based compound may be represented by Chemical Formula 1a below.

[Chemical Formula 1a]

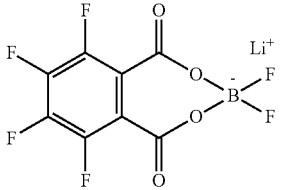

Also, the non-aqueous electrolyte according to an embodiment of the present invention may further include at least one borate-based compound selected from the group consisting of Chemical Formula 2 and Chemical Formula 3 in addition to the borate-based compound represented by Chemical Formula 1

[Chemical Formula 2]

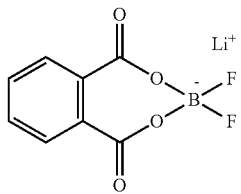

[Chemical Formula 3]

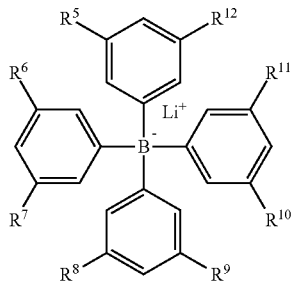

In Chemical Formula 3,
$R^5$ to $R^{12}$ are each independently hydrogen, an alkyl having 1 to 3 carbon atoms, a halogen, or a halogen-substituted alkyl having 1 to 3 carbon atoms.

Specifically, the borate-based compound of Chemical Formula 3 may be represented by Chemical Formula 3a below.

[Chemical Formula 3a]

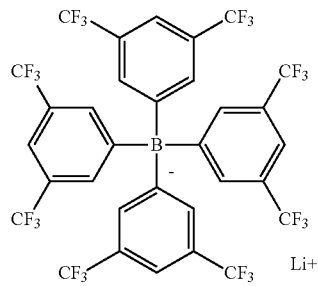

The borate-based compound may be included in an amount of 0.1 wt % to 20 wt % based on a total weight of the non-aqueous electrolyte. In the case that the amount of borate-based compound is less than 0.1 wt %, an effect of forming a robust solid coating layer on an electrode may be insignificant, and in the case in which the amount of borate-based compound is greater than 20 wt %, a decomposition reaction of the borate-based compound itself may become severe.

According to an embodiment of the present invention, the case that the borate-based compound of Chemical Formula 1 and the at least one borate-based compound selected from the group consisting of Chemical Formula 2 and Chemical Formula 3 are simultaneously included may be more desirable in terms of self-discharge than the case of using them alone.

The non-aqueous electrolyte according to the embodiment of the present invention is not particularly limited so long as the borate-based compound of Chemical Formula 1 and the at least one borate-based compound selected from the group consisting of Chemical Formula 2 and Chemical Formula 3 are included in an amount of 0.1 wt % to 20 wt % based on the total weight of the non-aqueous electrolyte. Specifically, the non-aqueous electrolyte according to the embodiment of the present invention may include the borate-based compound of Chemical Formula 1 and the borate-based compound selected from the group consisting of Chemical Formula 2 and Chemical Formula 3 in a mixing ratio (weight ratio) of 1:0.2 to 1:2.0, more specifically, 1:0.2 to 1:1.0.

According to another embodiment of the present invention, in the case that the borate-based compounds of Chemical Formula 1, Chemical Formula 2, and Chemical Formula 3 are all included, the non-aqueous electrolyte may include the borate-based compound of Chemical Formula 1, the borate-based compound of Chemical Formula 2, and the borate-based compound of Chemical Formula 3 in a weight ratio of 1:0.2:0.2 to 1:1.0:1.0

Typically, in order to improve cycle characteristics, there has been a case in which a non-aqueous electrolyte including boric acid tris-trimethylsilyl or boric acid tris-triethylsilyl as an additive, or a non-aqueous electrolyte including a chain carbonic acid ester and/or a chain carboxylic acid ester, tris(trimethylsilyl)borate, and an electrolyte salt is used. However, with respect to the non-aqueous electrolyte including the additives, since interfacial resistance increases to cause a swelling phenomenon of a cell during high-temperature storage, proper cycle characteristics and capacity retention ratio may be difficult to be obtained.

Thus, according to an embodiment of the present invention, a robust solid electrolyte interface (SEI), which may effectively prevent the decomposition of the electrolyte at an electrode surface during a charging process for the formation of a battery or a high-temperature aging process, may be formed by providing the non-aqueous electrolyte including the borate-based compound represented by Chemical Formula 1 or the non-aqueous electrolyte further including the at least one borate-based compound selected from the group consisting of Chemical Formula 2 and Chemical Formula 3. Accordingly, since the interfacial resistance of the secondary battery may be reduced, improvements in battery cycle characteristics and high-temperature storage stability, in particular, an improvement in high voltage battery life may be obtained.

In the non-aqueous electrolyte according to the embodiment of the present invention, the non-aqueous organic solvent and the lithium salt may include any kinds of organic solvents and lithium salts which are usable in a non-aqueous electrolyte during the preparation of a typical lithium secondary battery. In this case, the amount thereof may be appropriately changed within a usable range.

Specifically, the non-aqueous organic solvent may include typical organic solvents, which may be used as a non-aqueous organic solvent of a lithium secondary battery, such as a cyclic carbonate solvent, a linear carbonate solvent, an ester solvent, or a ketone solvent. These materials may be used alone or in a mixture of two or more thereof.

The cyclic carbonate solvent may include one selected from the group consisting of ethylene carbonate (EC), propylene carbonate (PC), and butylene carbonate (BC), or a mixed solution of two or more thereof. The linear carbonate solvent may include one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixed solution of two or more thereof. Also, the ester solvent may include one selected from the group consisting of methyl acetate, ethyl acetate, propyl acetate, methyl propionate, ethyl propionate, γ-butyrolactone, γ-valerolactone, and γ-caprolactone, or a mixed solution of two or more thereof. Furthermore, poly(methyl vinyl ketone) or the like may be used as the ketone solvent.

Also, in the non-aqueous electrolyte of the present invention, as the lithium salt, $LiPF_6$, $LiAsF_6$, $LiCF_3SO_3$, $LiN(CF_3SO_2)_2$, $LiBF_4$, $LiSbF_6$, $LiN(C_2F_5SO_2)_2$, $LiAlO_4$, $LiAlCl_4$, $LiCo_{0.2}Ni_{0.56}Mn_{0.27}O_2$, $LiCoO_2$, $LiSO_3CF_3$, and $LiClO_4$ may be used alone or in combination thereof. In addition, lithium salts, which are typically used in an electrolyte of a lithium secondary battery, may be used without limitations.

According to another embodiment of the present invention, provided is a lithium secondary battery including a cathode, an anode, a separator disposed between the cathode and the anode, and the non-aqueous electrolyte of the present invention.

In this case, the cathode is formed by including a cathode active material capable of intercalating and deintercalating lithium, and the anode is formed by including an anode active material capable of intercalating and deintercalating lithium.

As the cathode and anode active materials, any active materials may be used without limitation as long as these materials are used as cathode and anode active materials during the preparation of a lithium secondary battery. Typically, as the anode active material, a carbon-based anode active material, such as crystalline carbon, amorphous carbon, or a carbon composite, may be used alone or in a mixture thereof, and a manganese-based spinel active material or lithium metal oxide may be used as the cathode active material. Among the lithium metal oxides, cobalt or manganese-containing lithium-cobalt-based oxide, lithium-manganese-based oxide, lithium-nickel-manganese-based oxide, lithium-manganese-cobalt-based oxide, and lithium-nickel-manganese-cobalt-based oxide may be used. Among these compounds, lithium-cobalt-based oxide, lithium-manganese-based oxide, and lithium-nickel-manganese-based oxide, for example, may be used.

Any of lithium ion battery, lithium-ion polymer battery, and lithium polymer battery may be prepared and used as the above lithium secondary battery.

In general, in an initial charging process of a secondary battery, an SEI affecting a battery reaction may be formed on a surface of an anode (graphite) while an electrolyte is decomposed before lithium ions deintercalated from a cathode intercalate into the anode (graphite). The coating layer may not only have properties that pass lithium ions and block the movement of electrons, but may also act as a protective coating layer that prevents the electrolyte from being continuously decomposed. Thus, when the coating layer is formed on the surface of the anode, the decomposition of the electrolyte due to the electron movement between the electrode and the electrolyte is suppressed, and selectively, only the intercalation and deintercalation of lithium ions may be possible. However, the formed SEI may not stably exist until the lifetime of the battery ends, but may be destructed due to the shrinkage and expansion caused by repeated charge and discharge cycles or may be destructed due to the heat and impact from the outside. Charges are additionally or irreversible consumed while the destructed SEI is restored by continuous charge and discharge process, and thus, reversible capacity may be continuously decreased. In particular, the interfacial resistance increases as the thickness of the solid coating layer formed due to the decomposition of the electrolyte increases, and thus, the battery performance may degrade.

According to an embodiment of the present invention, since the non-aqueous electrolyte including at least one borate-based compound is used, a solid coating layer, which has high ionic conductivity and low electronic conductivity, resists the shrinkage and expansion of the electrode, and has excellent thermal stability, may be formed on the surface of the electrode. Accordingly, since an expansion phenomenon of the battery during high-temperature storage as well as transition metal dissolution may be prevented, a secondary battery having improved high-temperature cycle characteristics may be prepared. In addition, the additive may improve the battery performance by preventing the transition metal dissolution which occurs in the cathode.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

Preparation of Non-Aqueous Electrolyte

A 1 M $LiPF_6$ electrolyte (100 g) including ethylene carbonate (EC) and ethyl propionate (EP) at a weight ratio of 1:9 as a carbonate solvent was prepared. A non-aqueous electrolyte was prepared by adding the borate-based compound of Chemical Formula 1a (1 g) to the above electrolyte.

<Preparation of Lithium Secondary Battery>

A cathode mixture slurry was prepared by adding 96 wt % of $LiNi_{0.5}Mn_{1.5}O_4$ as a cathode active material, 2 wt % of carbon black as a conductive agent, and 2 wt % of polyvinylidene fluoride (PVdF) as a binder to N-methyl-2-pyrrolidone (NMP) as a solvent. An about 20 μm thick aluminum (Al) thin film as a cathode collector was coated with the cathode mixture slurry and dried, and the Al thin film was then roll-pressed to prepare a cathode.

Also, an anode mixture slurry was prepared by adding 96 wt % of artificial graphite as an anode active material, 3 wt % of PVdF as a binder, and 1 wt % of carbon black as a conductive agent to NMP as a solvent. A 10 μm thick copper (Cu) thin film as an anode collector was coated with the anode mixture slurry and dried, and the Cu thin film was then roll-pressed to prepare an anode.

A polymer type battery was prepared by a typical method using a polyethylene (PE) separator with the cathode and anode thus prepared, and a lithium secondary battery was then completed by injecting the prepared non-aqueous electrolyte.

Example 2

A lithium secondary battery was prepared in the same manner as in Example 1 except that the borate-based compound of Chemical Formula 1a (1 g) and the borate-based compound of Chemical Formula 2 (0.5 g), instead of the borate-based compound of Chemical Formula 1a (1 g), were mixed and added to the non-aqueous electrolyte of Example 1.

Example 3

A lithium secondary battery was prepared in the same manner as in Example 1 except that the borate-based compound of Chemical Formula 1a (1 g) and the borate-based compound of Chemical Formula 3a (0.5 g), instead of the borate-based compound of Chemical Formula 1a (1 g), were mixed and added to the non-aqueous electrolyte of Example 1.

Example 4

A lithium secondary battery was prepared in the same manner as in Example 1 except that the borate-based compound of Chemical Formula 1a (0.5 g), the borate-based compound of Chemical Formula 2 (0.5 g), and the borate-based compound of Chemical Formula 3a (0.5 g), instead of the borate-based compound of Chemical Formula 1a (1 g), were mixed and added to the non-aqueous electrolyte of Example 1.

Comparative Example 1

An electrolyte and a lithium secondary battery including the electrolyte were prepared in the same manner as in Example 1 except that the borate-based compound of Chemical Formula 2 (1 g), instead of the borate-based compound of Chemical Formula 1a (1 g), was added to the non-aqueous electrolyte of Example 1.

Comparative Example 2

An electrolyte and a lithium secondary battery including the electrolyte were prepared in the same manner as in Example 1 except that the borate-based compound of Chemical Formula 3a (1 g), instead of the borate-based compound of Chemical Formula 1a (1 g), was added to the non-aqueous electrolyte of Example 1.

Comparative Example 3

A lithium secondary battery was prepared in the same manner as in Example 1 except that the additive of Chemical Formula 1a was not added to the electrolyte of Example 1.

Experimental Example

Performance Evaluation Test

Experimental Example 1

Pouch cells having a capacity of 12.5 mAh were used as the lithium secondary batteries.

Lifetime evaluation of the secondary batteries prepared in Examples 1 to 4 and Comparative Examples 1 to 3 was performed under 1C/1C charge and discharge conditions at room temperature, and the results thereof are presented in FIG. 1.

As illustrated in FIG. 1, it may be understood that the lifetime characteristics of the secondary batteries of Examples 1 to 4 of the present invention were significantly improved in comparison to those of the secondary batteries of Comparative Examples 1 to 3.

Specifically, according to the results of charge and discharge tests of the secondary batteries of Examples 1 to 4 and Comparative Examples 1 to 3 performed at room temperature under 1C/1C charge and discharge conditions to about a $300^{th}$ cycle, it may be confirmed that capacities of Examples 1 to 4 including the borate-based compound of Chemical Formula 1a were 6 mAh to the $300^{th}$ cycle and the slopes of graphs were moderate, but with respect to Comparative Examples 1 to 3 not including the borate-based compound of Chemical Formula 1a, capacities were significantly decreased after about a 50$^{th}$ cycle.

In particular, it may be understood that the capacities of Examples 2 to 4, in which two kinds or more of the borate-based compounds including the borate-based compound of Chemical Formula 1a were used, were almost not changed from the initial cycle to the 300$^{th}$ cycle and were improved by 4 times or more in comparison to that of Comparative Example 2 at the 300$^{th}$ cycle.

With respect to Comparative Examples 1 and 3, capacity retention ratios were significantly decreased from about a 10$^{th}$ cycle, and the measurement was not possible after about a 80$^{th}$ cycle.

In high-temperature performance test, the secondary batteries prepared in Examples 1 to 4 and Comparative Examples 1 to 3 were respectively charged to a voltage of 4.85 V and then charged at a constant voltage of 4.85 V until the charge was terminated when a charge current became 0.63 mA. Thereafter, the batteries were stored at 45° C. for one week, and residual capacities after the high-temperature storage and capacities recovered after 1C charge were measured under 1C condition. The results thereof are presented in Table 1. As a result, as illustrated in FIG. 1, it may be confirmed that cycle characteristics of the secondary batteries of Examples 1 to 4 of the present invention were better than those of the battery of Comparative Example 3.

TABLE 1

|  | Additive (borate-based compound) | Residual capacity (mAh) | Recovery capacity (mAh) |
|---|---|---|---|
| Example 1 | Chemical Formula 1a | 3.8 | 7.2 |
| Example 2 | Chemical Formula 1a and Chemical Formula 2 | 5.5 | 8.4 |
| Example 3 | Chemical Formula 1a and Chemical Formula 3a | 7.2 | 7.9 |
| Example 4 | Chemical Formula 1a, Chemical Formula 2, and Chemical Formula 3a | 9.5 | 8.3 |
| Comparative Example 1 | Chemical Formula 2 | 3.2 | 6.9 |
| Comparative Example 2 | Chemical Formula 3a | 3.5 | 6.8 |
| Comparative Example 3 | X | 0.2 | 4.7 |

As illustrated in Table 1, the secondary batteries prepared in Examples 1 to 4 of the present application has a residual capacity of 3.8 mAh or more and a recovery capacity of 7.2 mAh or more, and thus, it may be confirmed that the residual capacity and recovery capacity were significantly increased in comparison to those of Comparative Examples 1 to 3.

In particular, with respect to Examples 1 to 4 in which the borate-based compound of Chemical Formula 1a as the characteristics of the present invention was added, it may be understood that the residual capacities and recovery capacities were respectively improved by about 1% to about 460% or more and about 15 to about 80% in comparison to those of Comparative Examples 1 to 3 in which the borate-based compound of Chemical Formula 1a was not added.

Also, in the case that one kind of the borate-based compound was added, the residual capacity and recovery capacity of Example 1, in which the borate-based compound of Chemical Formula 1a was added, were higher than those of Comparative Example 1 or 2 in which the borate-based compound of Chemical Formula 2 or 3a was respectively added.

In particular, with respect to Examples 2 to 4 using two kinds or more of the borate-based compounds, it may be understood that the residual capacity and recovery capacity were respectively improved by 80% to 150% and 9% to 15% in comparison to those of Example 1 using the borate-based compound of Chemical Formula 1a alone.

Also, with respect to Comparative Example 3 in which the borate-based compounds of Chemical Formulae 1a to 3a were not added, it may be understood that the residual capacity and recovery capacity were respectively reduced by 180% or more and 50% or more in comparison to those of Example 1.

Therefore, in the case that the borate-based compound of Chemical Formula 1a, for example, the borate-based compound of Chemical Formula 1a in combination of the borate-based compound of Chemical Formula 2 or 3a or in combination of the borate-based compounds of Chemical Formulae 2 and 3a, was used according to the embodiment of the present invention, it may be confirmed that the residual capacity and recovery capacity of the secondary battery may be significantly improved.

The invention claimed is:

1. A non-aqueous electrolyte comprising:

a non-aqueous organic solvent;

a lithium salt;

a borate-based compound represented by Chemical Formula 1;

[Chemical Formula 1]

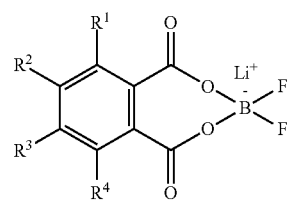

where $R^1$ to $R^4$ are each independently a halogen or a halogen-substituted alkyl having 1 to 3 carbon atoms; and at least one borate-based compound comprising Chemical Formula 2:

[Chemical Formula 2]

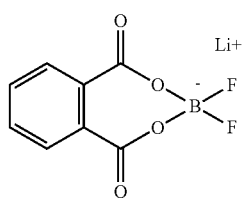

and at least one borate-based compound comprising Chemical Formula 3

[Chemical Formula 3]

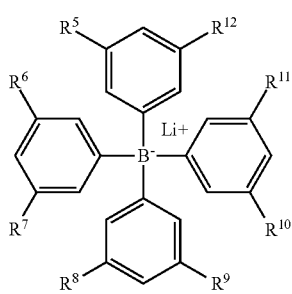

where $R^5$ to $R^{12}$ are each independently hydrogen, an alkyl having 1 to 3 carbon atoms, a halogen, or a halogen-substituted alkyl having 1 to 3 carbon atoms.

2. The non-aqueous electrolyte of claim 1, wherein the borate-based compound of Chemical Formula 1 is represented by Chemical Formula 1a:

[Chemical Formula 1a]

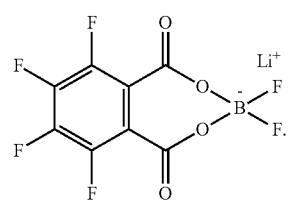

3. The non-aqueous electrolyte of claim 1, wherein the borate-based compound of Chemical Formula 3 is represented by Chemical Formula 3a:

[Chemical Formula 3a]

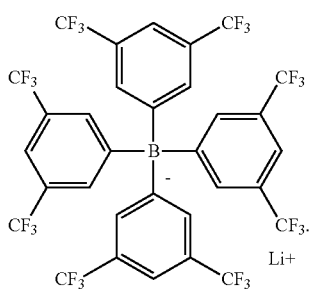

4. The non-aqueous electrolyte of claim 1, wherein the borate-based compound of Chemical Formula 1 is included in an amount of 0.1 wt % to 20 wt % based on a total weight of the non-aqueous electrolyte.

5. The non-aqueous electrolyte of claim 1, wherein a weight ratio of the borate-based compound of Chemical Formula 1 and the borate-based compound selected from either Chemical Formula 2 or Chemical Formula 3 is 1:0.2 to 1:2.0.

6. The non-aqueous electrolyte of claim 1, wherein the non-aqueous electrolyte comprises the borate-based compound of Chemical Formula 1, the borate-based compound of Chemical Formula 2, and the borate-based compound of Chemical Formula 3 in a weight ratio of 1:0.2:0.2 to 1:1.0:1.0.

7. The non-aqueous electrolyte of claim 1, wherein the non-aqueous organic solvent comprises one selected from the group consisting of a cyclic carbonate solvent, a linear carbonate solvent, an ester solvent, and a ketone solvent, or a mixed solution of two or more thereof.

8. The non-aqueous electrolyte of claim 7, wherein the cyclic carbonate solvent comprises one selected from ethylene carbonate, propylene carbonate, butylene carbonate, or a mixed solution of two or more thereof.

9. The non-aqueous electrolyte of claim 7, wherein the linear carbonate solvent comprises one selected from dimethyl carbonate, diethyl carbonate, dipropyl carbonate, ethylmethyl carbonate, methylpropyl carbonate, ethylpropyl carbonate, or a mixed solution of two or more thereof.

10. The non-aqueous electrolyte of claim 7, wherein the ester solvent comprises one selected from methyl acetate, ethyl acetate, propyl acetate, methyl propionate, ethyl propionate, γ-butyrolactone, γ-valerolactone, or γ-caprolactone, or a mixed solution of two or more thereof.

11. The non-aqueous electrolyte of claim 1, wherein the lithium salt comprises at least one selected from $LiPF_6$, $LiAsF_6$, $LiN(CF_3SO_2)_2$, $LiBF_4$, $LiSbF_6$, $LiN(C_2F_5SO_2)_2$, $LiAlO_4$, $LiAlCl_4$, $LiSO_3CF_3$, or $LiClO_4$.

12. A lithium secondary battery comprising:
a cathode;
an anode;
a separator disposed between the cathode and the anode; and
the non-aqueous electrolyte of claim 1.

13. The lithium secondary battery of claim 12, wherein the lithium secondary battery is a lithium ion secondary battery or a lithium polymer secondary battery.

* * * * *